United States Patent [19]
Kilander

[11] Patent Number: 5,950,345
[45] Date of Patent: Sep. 14, 1999

[54] STREAMER DEVICES ESPECIALLY USEFUL AS FISHING LURES

[76] Inventor: Holger Kilander, HC 75, Box 152, Hackensack, Minn. 56452

[21] Appl. No.: 09/047,606

[22] Filed: Mar. 25, 1998

[51] Int. Cl.⁶ ..................................................... A01K 85/00
[52] U.S. Cl. .............................. 43/2; 43/42.24; 43/42.29; 43/42.32
[58] Field of Search .................................... 43/2, 4, 42.24, 43/42.28, 42.29, 42.32, 42.33; D22/125, 126, 132, 133; 40/412, 422, 439; 73/170.01, 170.05; 446/199; D10/59; D11/165–173; 244/153 A, 153 R; D12/321; D21/436, 438, 445

[56] References Cited

U.S. PATENT DOCUMENTS

| | | | |
|---|---|---|---|
| D. 57,449 | 3/1921 | Shrum | D21/438 |
| 176,721 | 4/1876 | Whitcomb | 244/153 R |
| 889,804 | 6/1908 | Pflueger | 43/42.28 |
| 1,555,029 | 9/1925 | Russell | 43/42.32 |
| 1,787,726 | 1/1931 | Heddon et al. | 43/42.28 |
| 1,854,027 | 4/1932 | Gruenhagen | 43/42.29 |
| 1,925,197 | 9/1933 | Maynard | 43/42.28 |
| 2,933,847 | 4/1960 | Frasure | 43/42.33 |
| 2,941,765 | 6/1960 | Feldman | 244/153 R |
| 3,186,120 | 6/1965 | Layson | 43/2 |
| 3,271,897 | 9/1966 | Gelinas | D22/133 |
| 3,561,151 | 2/1971 | Ne Hoda | 43/35 |
| 3,895,455 | 7/1975 | Johnston | D22/126 |
| 4,433,502 | 2/1984 | Steeve | 43/43.2 |
| 4,619,067 | 10/1986 | West | 43/42.28 |
| 4,624,648 | 11/1986 | Waters | 73/170.05 |
| 4,676,020 | 6/1987 | Taylor et al. | 43/42.02 |
| 4,831,770 | 5/1989 | Dworski | 43/42.24 |
| 5,029,774 | 7/1991 | Berzack | 244/153 R |
| 5,155,948 | 10/1992 | Kitagawa | 43/42.28 |
| 5,640,798 | 6/1997 | Garst | 43/42.53 |
| 5,727,980 | 3/1998 | Stipa | 244/153 R |

*Primary Examiner*—Michael J. Carone
*Assistant Examiner*—Darren W. Ark
*Attorney, Agent, or Firm*—L. MeRoy Lillehaugen; Alan Kamrath

[57] ABSTRACT

A streamer device (10) is utilized as a fishing lure and includes a collar (12) secured to the trailing end of a fishing line by a swivel union (36) and a yoke (26). The yoke (26) is preferably formed by flaccid members (28) each including a connector (32) at their leading ends for receipt on a loop (38) of the swivel union (36) and each including a head (34) at their trailing ends which can be flexed in a direction parallel to their stems (30) for insertion into apertures (22) formed in the collar (12). Ribbons (42) are removably secured to the collar (12) by openings (44) formed in the ribbons (42) slideably received on tabs (24) formed on the trailing edge (16) of the collar (12), with the ribbons (42) extending around the leading edge (14) and past the trailing edge (16) of the collar (12) for acting as streamers in the water. The ribbons (42) include indicia (45) in the most preferred form of bait such as fish. Aside from the indicia (45), the streamer device (10) is transparent in water and gives an impression of a whole school of swimming bait when pulled through the water. Cuts (46) extending partially around the indicia (45) provide life like action to the indicia (45).

21 Claims, 2 Drawing Sheets

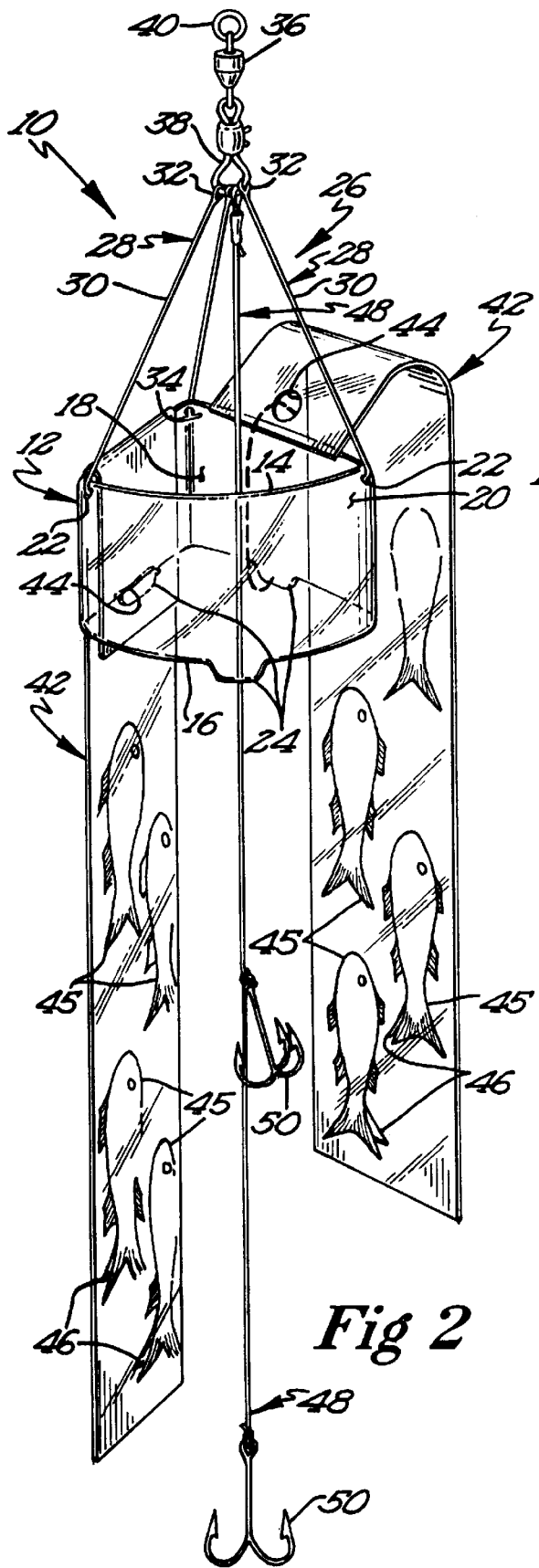
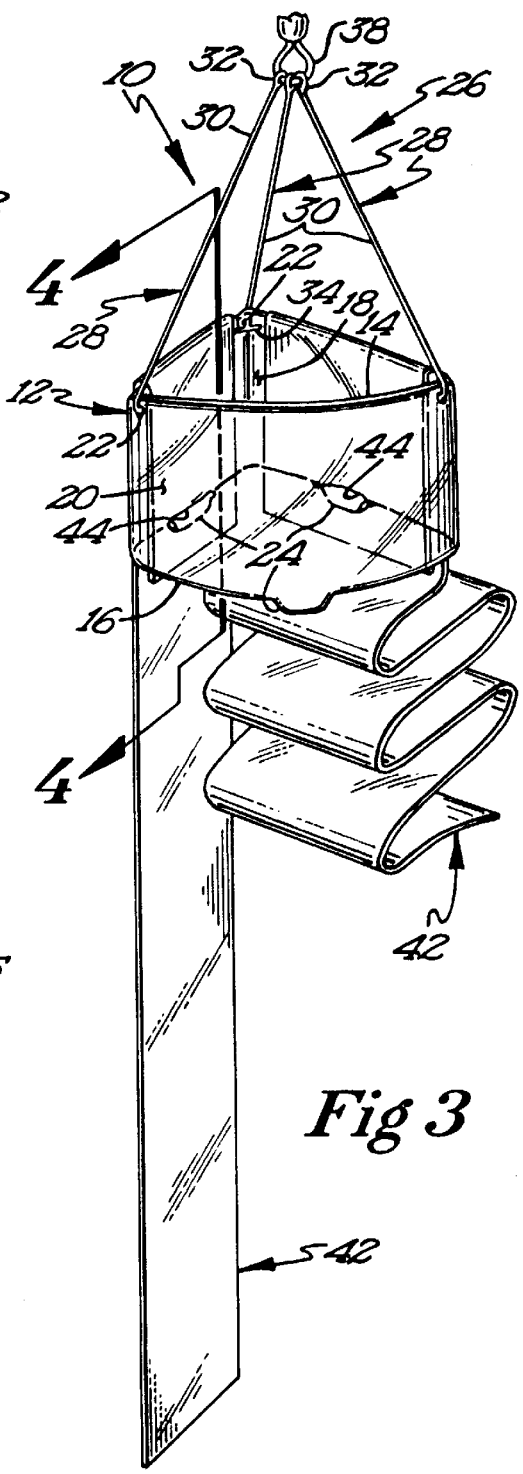

STREAMER DEVICES ESPECIALLY USEFUL AS FISHING LURES

BACKGROUND

The present invention generally relates to streamer devices, particularly to streamer devices especially useful as fishing lures, and especially to streamer devices which are relatively inexpensive to manufacture and can be easily assembled without the use of tools even by the user of the streamer devices.

Many lures used in fishing, whether live or artificial, represent a natural source of food for the fish desired to be caught. An example of such a source of food would be other fish of smaller size. Often, the natural source of food travel together such as schools of fish. However, during fishing, only a single or a very limited number of lures are presented to the prospective fish desired to be caught. To increase effectiveness, the fishing lure should give the impression of a whole school of bait which more closely resembles natural feeding conditions of the fish desired to be caught. In addition, it would be desirable that the fishing lures have other attributes which increase their usefulness and marketability. In particular, the fishing lure should have the ability to change the type of school of bait being presented according to fishing conditions and the type of fish desired to be caught. Additionally, to reduce costs to the user, the fishing lure should be easily and relatively inexpensively manufactured and should be easily assembled (and at least partially disassembled) without the use of tools even by the user of the fishing lure in the field while fishing.

SUMMARY

The present invention solves these needs and other problems in the field of streamer devices by providing, in the preferred form, a plurality of ribbons individually removably received on a collar, with the ribbons including openings slideably received on tabs adjacent the trailing edge of the collar and extending from the openings around the leading edge and past the trailing edge of the collar.

In other aspects of the present invention, the streamer device is utilized as a fishing lure wherein a fish hook is positioned relative to a plurality of flexible ribbons secured to and acting as streamers from a collar pulled through water by flaccid members having trailing ends connected to the collar at spaced locations and having leading ends connected to a fishing line. In most preferred aspects, the ribbons include indicia in the form of bait for the fish desired to be caught and in the form to give the impression of a whole school of bait when the streamer device is pulled through the water and are removably secured to the collar so that the type of impression given can be changed according to fishing conditions and the type of fish desired to be caught.

It is thus an object of the present invention to provide a novel streamer device.

It is further an object of the present invention to provide such a novel streamer device especially useful as a fishing lure.

It is further an object of the present invention to provide such a novel streamer device giving the impression of a whole school of fish bait when pulled through water.

It is further an object of the present invention to provide such a novel streamer device which can be easily and inexpensively manufactured.

It is further an object of the present invention to provide such a novel streamer device which can be easily assembled without tools even by the user of the device.

It is further an object of the present invention to provide such a novel streamer device including easily interchangeable, elongated, flexible ribbons.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a perspective view of the streamer device of FIG. 1 in a vertical condition, with portions being removed and portions being exploded therefrom.

FIG. 3 shows a perspective view of the streamer device of FIG. 1 in a vertical condition, with portions being removed and portions being prepared for use in cast fishing.

Figures 1, 4, 5A, 5B:
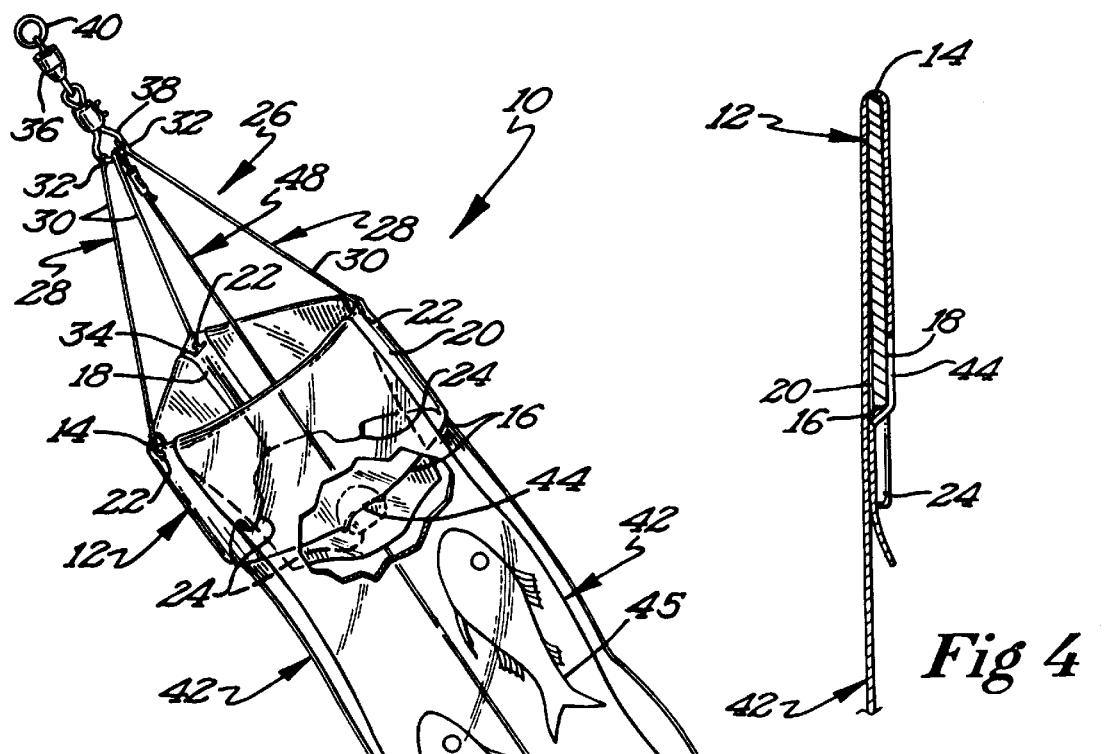
FIG. 1 shows a perspective view of a streamer device being used as a fishing lure according to the most preferred teachings of the present invention.
FIG. 4 shows a cross sectional view of the streamer device of FIG. 1 according to section line 4—4 of FIG. 3.
FIGS. 5A and 5B show diagrammatic cross sectional views of the preferred method of assembly of the streamer device of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has be en read a nd understood.

Where used in the various figures of the drawings, the same numerals designate the same or similar parts. Furthermore, when the terms "first", "second", "inside", "outside", "outer", "inner", "width", "length", "edge", "end", "vertical", "trailing", "leading", and similar terms are used herein, it should be understood that these terms have reference only to the structure shown in the drawings as it would appear to a person viewing the drawings and are utilized only to facilitate describing the illustrative embodiment.

DESCRIPTION

A streamer device is shown in the most preferred form as a fishing lure according to the preferred teachings of the present invention and generally designated 10. Generally, device 10 includes a collar 12 in the preferred form formed of clear or transparent material which generally is not visible when submerged in water such as of plastic. In the most preferred form, collar 12 has annular cross sections of generally equal size and having any desired shape such as annular cross sections including a plurality of straight linear sides interconnected together, with the sides having equal lengths. Shapes of annular cross sections for collar 12 include but are not limited to triangular as shown and circular. Generally, collar 12 includes a leading edge 14, a trailing edge 16, an interior surface 18, and an exterior surface 20. A plurality of apertures 22 are formed in collar 12 extending through surfaces 18 and 20 adjacent to but spaced from leading edge 14. Apertures 22 are equally circumferentially spaced around the annular shape of collar 12 and in the case of a multisided annular shape such as generally triangular as shown are located at the interconnection of the sides of the annular shape. A plurality of tabs 24 are integrally formed on and extend continuously from trailing edge 16 in a direction opposite to leading edge 14. Tabs 24 are circumferentially offset from apertures 22, with three tabs 24 being shown in the preferred form with tabs 24 generally centered on the sides of the annular shape intermediate their interconnections.

Device 10 further includes a yoke 26 for connection to collar 12, with yoke 26 being formed of transparent material which generally is not visible when submerged in water. In the preferred form, yoke 26 includes a plurality of elongated members 28 which normally yield to pressure for want of stiffness or in other words flaccid members 28 of a number corresponding to the number of apertures 22. In the most preferred form, members 28 are formed of a flexible polyethylene and of a construction similar to that used by stores to hold tags and the like on garments. In particular, members 28 include an elongated stem 30 which terminates at its leading end in an annular connector 32 and terminates at its trailing end in a head 34. Head 34 has a cross sectional or diametric size corresponding to that of stem 30, with the cross sectional or diametric size being substantially shorter than the length of head 34. Stem 30 integrally terminates in head 34 generally intermediate the opposite ends of head 34 at a nonparallel direction to head 34 and generally perpendicular thereto in the most preferred form.

The trailing ends of members 28 can be inserted through apertures 22 from exterior surface 20 through interior is surface 18 by flexing head 34 to be generally parallel to stem 30 until head 34 extends through apertures 22 and is located completely beyond interior surface 18. At that time, head 34 can be released to return to its natural condition to extend in a nonparallel relation with stem 30 as shown in FIG. 5B. With stem 30 extending through aperture 22, head 34 will abut with interior surface 18 and prevent removal of member 28 from aperture 22. Thus, with heads 34 abutting with interior surface 18, the trailing ends of flaccid members 28 are connected to collar 12 at spaced locations and in the most preferred form at circumferentially spaced locations. Apertures 22 should be of a minimum diametric size slightly larger than the combined diametric sizes of stem 30 and head 34 to allow insertion of members 28 when head 34 is flexed to be parallel to stem 30 and of a maximum diametric size which is substantially smaller than the length of head 34 between its opposite ends to prevent passage of head 34 when in a nonparallel relation to stem 28 even when a relatively large tensional force is placed on members 28. However, if desired for some reason, members 28 can be manually removed by simply reversing the insertion procedure. In the preferred form, apertures 22 are of a size so that annular connectors 32 are unable to pass therethrough.

Yoke 26 further includes according to the preferred teachings of the present invention a swivel union 36, which in the most preferred form is a standard, off the shelf product utilized in the fishing industry. In particular, union 36 includes a first loop 38 for receipt of connectors 32 of members 28 and in the most preferred form is manually openable. Union 36 includes a second loop 40 for receipt of the trailing end of a fishing line or other support as desired. Thus, the leading ends of flaccid members 28 are adapted for connection to the fishing line by swivel union 36 in the preferred form shown. Union 36 includes suitable provisions for allowing relative rotation between loops 38 and 40 in the most preferred form. It should be appreciated that union 36 can take forms other than as shown according to the teachings of the present invention.

Device 10 further includes at least one flexible ribbon 42, in the preferred form a plurality of flexible ribbons 42, and in the form shown a plurality of flexible ribbons 42 of a number equal to the number of sides of the annular shape of collar 12. Ribbons 42 are of an elongated length substantially greater than the distance between leading and trailing edges 14 and 16 of collar 12 and formed of flexible material such as clear polymeric film. Ribbons 42 have a width which is substantially less than the elongated length of ribbons 42. In the preferred form shown, the widths of ribbons 42 are generally equal to the diametric dimension of the annular cross sections of collar 12 in the preferred form and in the most preferred form where the annular cross sections include a plurality of straight linear sides interconnected together, generally equal to the width of the sides of the annular shape of collar 12.

Ribbons 42 each include an opening 44 adjacent to its leading edge and of a size for slideable receipt on tab 24. In the preferred form, openings 44 are punched or cut in ribbons 42 in the most preferred form of a circular shape having a diametric dimension less than the length or circumferential extent of tabs 24. Forming openings 44 in a shape having both lateral and longitudinal dimensions reduces the tendency of tearing of ribbons 42 which can occur if openings 44 were formed by a simple linear cut.

The leading edge of ribbon 42 can be extended through leading edge 14 into the interior of collar 12 until the leading edge of ribbon 42 extends past trailing edge 16 of collar 12. At that time, ribbon 42 can be deformed such that tab 24 extends into opening 44 and pulled to abut with interior surface 18. Specifically, opening 44 is deformed into an elongated shape corresponding to and for receipt on the cross sectional shape of tab 24. Once opening 44 is stretched to be received on tab 24, the elastic quality of the material forming ribbons 42 tends to result in opening 44 gripping tab 24 to prevent unintentional removal of ribbon 42 from tab 24. Ribbon 42 can then be folded around leading edge 14 of collar 12 and abutted with exterior surface 20 and extend past trailing edge 16 of collar 12. Thus, ribbons 42 are releasably secured to collar 12 for acting as streamers in the water as collar 12 is pulled through the water by flaccid members 28, swivel union 36, and the fishing line, with tensional forces placed on the free end of ribbons 42 tending to pull openings 44 further on tabs 24.

In the preferred form, ribbons 42 are formed of translucent material and in the most preferred form of clear or transparent material which is generally not visible when submerged in water. Additionally, in the preferred form, ribbons 42 include indicia 45 printed, silk screened, adhered, or otherwise placed thereon. In the form shown, indicia 45 is in the form of fish when device 10 is intended to be utilized as a fishing lure. Further, in the preferred form, ribbons 42 include cuts 46 which partially extend along the periphery of indicia 45 to form partially cut portions which are allowed to flex relative to the remaining portions of ribbons 42. In the most preferred form shown, cuts 46 extend around the tail and/or fins of indicia 45 in the form of a fish so that the partially cut portions including the tail and fin can flex relative to the remaining portions of ribbons 42 including the body portion of indicia 45 in the form of a fish.

When utilized as a fishing lure, device 10 further includes a fishing leader 48 having one or more hooks 50 for hooking, catching or holding in the mouth of a fish. Hooks 50 are positioned in device 10 relative to ribbons 42, and in the most preferred form, the leading end of leader 48 is attached to loop 38 of swivel union 36 with connectors 32 of members 28. In the form shown, a first hook 50 is positioned on the trailing end of leader 48 and beyond the trailing ends of ribbons 42 and is especially adapted for receipt of bait such as but not limited to bait in the form of indicia 45 on ribbons 42. Further, in the form shown, a second hook 50 is positioned on leader 48 intermediate its leading and trailing ends and intermediate the trailing ends of ribbons 42 and collar 12. A plurality of hooks 50 are typically provided when device 10 is utilized for troll fishing and only a single hook 50 is typically provided when device 10 is utilized for cast fishing.

When utilized as a fishing lure, the trailing end of a fishing line is suitably secured to loop 40 in any desired manner such as by tying. Device 10 is then pulled through the water by the fishing line. Water will flow through device 10 inside of collar 12 as well as along the outer surfaces of ribbons 42 outside of collar 12. Thus, device will act like a wind sock as it is pulled through the water, with ribbons 42 flexing in the water. It can be appreciated that collar 12 should be formed of generally rigid or semirigid material and specifically from material which retains its shape sufficient to hold the leading ends of ribbons 42 in the desired position as device 10 is pulled through the water under normal fishing conditions. In the form shown, device 10 according to the teachings of the present invention gives the impression of a whole school of fish swimming through the water including the bait on hook 50 of leader 48. This impression is further enhanced due to the transparency of collar 12, yoke 26, and ribbons 42 in water so that only indicia 45 can be seen or is visible to the fish desired to be caught. In addition to the flexing of ribbons 42 as device 10 passes through the water, cuts 46 allow indicia 45 in the form of fish to flex relative to ribbons 42 to provide a more life like action to the fish. In this regard, device 10 according to the preferred teachings of the present invention could be pulled through the water to further imitate the natural movement of the type of indicia 45 on ribbons 42 such as in a slow, fast, stop and go, jerking, or like manner.

With collar 12 having an annular shape and with leader 48 extending generally axially within collar 12 and ribbons 42 streaming therefrom such as in the most preferred form shown, device 10 according to the preferred teachings of the present invention is substantially weedless. Specifically, flaccid members 28 and collar 12 tend to cam weeds outward and create a path therethrough while ribbons 42 tend to hold the weeds outward and/or cover hooks 50 so that snagging of hooks 50 on weeds and the like is less likely to occur than if hooks 50 (with or without bait) were simply pulled through the weeds.

Device 10 according to the preferred teachings of the present invention can be easily and inexpensively manufactured. Specifically, in the most preferred form, swivel union 36 and flaccid members 28 are off the shelf, readily available, mass produced items which can be economically purchased so that the capital costs associated with fabrication are avoided. Likewise, collar 12 according to the preferred teachings of the present invention is formed from a one piece, integral component not requiring assembly which can be fabricated from tubular stock material or can be easily fabricated by molding. Ribbons 42 according to the preferred teachings of the present invention are formed from a one piece, integral component not requiring assembly and from material upon which indicia 45 can be easily silk screened, printed, adhered or otherwise applied thereupon, with openings 44 and cuts 46 being die cut or otherwise created during the application of indicia 45.

Additionally, device 10 according to the preferred teachings of the present invention can be easily and rapidly assembled and without the use of tools. This is advantageous for several reasons. First, the cost of device 10 can be minimized due to the ease of assembly and in fact device 10 in the most preferred form can be marketed for partial or complete assembly by the purchaser. Additionally, when utilized as a fishing lure, ribbons 42 can be easily replaced in the field by the user of device 10. Ribbons 42 may need replacement if they are torn or are otherwise damaged during normal use. Additionally, it may be desired to replace ribbons 42 having different types of indicia 45. For example, the particular ribbons 42 selected would depend upon the particular type of fish that the user of device 10 was attempting to catch, the particular type of bait that the desired fish were attracted to and the like. In this regard, indicia 45 could be in the form of bait fish as shown and of any desired type including but not limited to minnows, ciscos, ballyhoo, lady fish and mullet or could be in the form of shrimp, crayfish, crawfish, lobster, squid or the like. It should be appreciated that indicia 45 should be positioned on ribbons 42 in a manner so that device 10 best approximates movement through the water. As an example, fish, shrimp, and crayfish move forward in the water while crawfish move backward when alarmed. Furthermore, for storage and safekeeping, ribbons 42 can be removed from collar 12 and rolled or folded for placement in a sealed, clear plastic bag. However, if desired and after leader 48 and hooks 50 are removed, ribbons 42 can be folded or rolled after removal from collar 12 and placed in collar 12 or can be simply crumpled up and stuffed in collar 12 while still attached to collar 12 for protection by collar 12.

According to the preferred teachings of the present invention, device 10 can be made in various sizes and can include varying number of ribbons 42. As an example, collar 12 can have annular shapes of a diameter corresponding to the type of fish desired to be caught when device 10 is utilized as a fishing lure such as from trout to bass. Likewise, collar 12 can be shaped and sized according to the type of fishing device 10 is being utilized for. In this regard, when desired to be cast, the diametric dimension of collar 12 of an annular shape can be related to the width of ribbons 42 such that ribbons 42 can be crumpled up and pushed into collar 12 for casting but a pull on the fishing line to which device 10 is secured while device 10 is in the water should cause the flow of water through the interior of collar 12 to unfold ribbons 42 from collar 12 so that they act as streamers for collar 12. It should be appreciated that the deformation of openings 44 for receipt on tabs 24 generally prevents the unintentional removal of ribbons 42 from tabs 24 while ribbons 42 are being crumpled into and while crumpled in collar 12.

Similarly, although collar 12 is shown as annular shaped, collar 12 can have other shapes such as planar or V-shaped for being dragged on the bottom of the water body. In this regard, floats could be added adjacent to swivel union 36 and/or weights could be added to collar 12 or adjacent the trailing ends of members 28, with ribbons 42 being selected including indicia 45 of the type which would normally move on or adjacent to the bottom of the water body such as crawfish and crayfish.

Device 10 can include other items which help attract fish according to the teachings of the present invention. As an example, a scent bag could be further attached to loop 38 and positioned in front, inside, or slightly rearward of collar 12. The scent bag releases a scent, attraction, or the like, including but not limited to blood, in the water as device 10 is drawn through the water. In this regard, the trailing end of the scent bag could include a hole including a plug which falls out when wet, with the plug being formed by tape, a small piece of bread, or other material that would dissolve in water.

Although shown in the preferred form as a fishing lure, device 10 can have other applications according to the teachings of the present invention such as windsocks. Specifically, due to the ease of fabrication and the possibility of consumer assembly, device 10 according to the teachings of the present invention would have particular application as a promotional item to be given away or sold at a minimal cost. Indicia 45 would be suitable such applications such as but not limited to names, slogans, logos, trademarks, and the like of sport teams, companies, fish tournament sponsors, or the like. Alternately, ribbons 42 could be plain and device 10 retailed with markers so that the purchaser of device 10 can create indicia 45 of their choosing according to the teachings of the present invention.

Likewise, although device 10 in the most preferred form includes several features which in combination are believed to produce synergistic results, device 10 according to the teachings of the present invention can be fabricated with such features individually or in other combinations. As an example, yoke 26 can be fabricated by other means and other manners than flaccid members 28 of the type shown and described. Similarly, although ribbons 42 in the most preferred form are removably secured to collar 12 and are believed to be advantageous, ribbons 42 according to the teachings of the present invention can be secured in other fashions such as but not limited to in a nonremovable manner or in other removable manners.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. A streamer for removable securement to a collar having a leading edge and a trailing edge, with the collar including at least one tab extending past the trailing edge of the collar in a direction opposite to the leading edge, comprising, in combination: a flexible ribbon of an elongated length substantially greater than the distance between the leading and trailing edges of the collar, with the ribbon including an opening of a size for slideable receipt on the tab of the collar, with the opening adapted to be received on the tab of the collar with the ribbon extending around the leading edge and past the trailing edge of the collar; and indicia formed on the ribbon.

2. The streamer of claim 1 wherein the ribbon includes cuts extending partially around the indicia to form partially cut portions, with the partially cut portions being allowed to flex relative to the remaining portions of the ribbon.

3. The streamer of claim 2 wherein the ribbon is formed of material which is transparent in water so that only the indicia is visible when submerged in water.

4. The streamer of claim 3 wherein the indicia is in the form of bait for fish desired to be caught giving an impression of a school of swimming bait when the ribbon is pulled through water.

5. A fishing lure for attachment to a fishing line comprising, in combination: a collar; at least two flaccid line members each having a trailing end and a leading end, with the trailing ends of the flaccid line members being connected to the collar at spaced locations, with the leading ends of the flaccid line members being adapted for connection to the fishing line; a plurality of flexible ribbons of an elongated length secured to the collar for acting as streamers in the water as the collar is pulled through the water by the flaccid line members; and at least one fish hook positioned relative to the ribbons and for hooking in the mouth of a fish.

6. The fishing lure of claim 5 wherein the ribbons each include indicia in the form of bait for the fish desired to be caught and giving an impression of a whole school of swimming bait when the ribbons are pulled through the water.

7. The fishing lure of claim 6 wherein the ribbons each include cuts extending partially around the indicia to form partially cut portions, with the partially cut portions being allowed to flex relative to the remaining portions of the ribbons when the ribbons are pulled through the water.

8. The fishing lure of claim 5 wherein the collar has annular cross sections, with the trailing ends of the flaccid line members being at circumferentially spaced locations on the collar.

9. The fishing lure of claim 8 wherein the annular cross sections have a diametric dimension; and wherein the ribbons have a width which is substantially less than the elongated length and generally equal to the diametric dimension so that the ribbons can be crumpled up and pushed into the collar for casting but water flow through the collar unfolds the ribbons from the collar.

10. The fishing lure of claim 8 wherein the annular cross sections include a plurality of straight linear sides interconnected together, with the sides of the annular cross sections having equal lengths; wherein the plurality of ribbons are of a number equal to that of the plurality of sides of the annular cross sections of the collar; and wherein the ribbons have a width which is substantially less than the elongated length and generally equal to the lengths of the sides of the annular cross sections of the collar.

11. The fishing lure of claim 5 wherein the plurality of ribbons are removably secured to the collar.

12. The fishing lure of claim 11 wherein the collar has a leading edge and a trailing edge, with the trailing ends of the flaccid line members being connected adjacent to the leading edge of the collar, with the collar including a plurality of tabs extending past the trailing edge of the collar in a direction opposite to the leading edge; and wherein the ribbons each include an opening of a size for slideable receipt on one of the tabs of the collar, with the openings received on the tabs of the collar and the ribbons extending around the leading edge and past the trailing edge of the collar.

13. The fishing lure of claim 5 wherein the collar includes a plurality of apertures; wherein each of the flaccid line members has a diametric size; and wherein the trailing ends of each of the flaccid line members integrally terminate intermediate opposite ends of a head extending at a nonparallel direction from the flaccid line member, with the head having a length between the opposite ends substantially larger than the diametric size of the flaccid line member and having a diametric size substantially less than the length of the head between the opposite ends; wherein the heads of the flaccid line members are positionable generally parallel to the flaccid line members for insertion into the apertures of the collar and after insertion through the apertures positionable at the nonparallel direction to prevent removal of the flaccid line members from the apertures.

14. The fishing lure of claim 13 wherein the leading ends of the flaccid line members integrally terminate in connectors of a size which are unable to pass through the apertures of the collar.

15. The fishing lure of claim 14 further comprising, in combination: a swivel union including a first loop for receipt of the connectors of the flaccid line members, and a second loop for receipt of the fishing line, with the first and second loops being rotatable relative to each other.

16. The fishing lure of claim 14 wherein the fish hook includes a leader having a leading end, with the leading end being received on the first loop of the swivel union with the connectors of the flaccid line members.

17. A streamer device comprising, in combination: a collar having a leading edge and a trailing edge, with the collar including a plurality of tabs extending past the trailing edge of the collar in a direction opposite to the leading edge; a plurality of flexible ribbons of an elongated length, with the ribbons each including an opening of a size for slideable receipt on one of the tabs of the collar, with the openings adapted to be received on the tabs of the collar with the ribbons extending around the leading edge and past the trailing edge of the collar for acting as streamers; and at least one fish hook positioned relative to the ribbons and for hooking in the mouth of a fish.

18. The streamer device of claim 17 wherein the ribbons each include indicia.

19. The streamer device of claim 18 wherein the ribbons each include cuts extending partially around the indicia to form partially cut portions, with the partially cut portions being allowed to flex relative to the remaining portions of the ribbons.

20. The streamer device of claim 19 wherein the indicia is in the form of bait for fish desired to be caught giving an impression of a whole school of swimming bait when the collar is pulled through water.

21. The streamer device of claim 17 wherein the collar has annular cross sections including a plurality of straight linear sides interconnected together, with the sides of the annular cross sections of the collar having equal lengths; wherein the plurality of ribbons are of a number equal to that of the plurality of sides of the annular cross sections of the collar; and wherein the ribbons have a width which is substantially less than the elongated length and generally equal to the lengths of the sides of the annular cross sections of the collar.

* * * * *

UNITED STATES PATENT AND TRADEMARK OFFICE
CERTIFICATE OF CORRECTION

PATENT NO : 5,950,345

DATED : September 14, 1999

INVENTOR(S) : Holger Kilander

It is certified that error appears in the above-identified patent and that said Letters Patent is hereby corrected as shown below:

Col. 2, line 37, cancel "be en" and substitute therefor -- been --.

Col. 2, line 37, cancel "a nd" and substitute therefor --and--.

Col. 3, line 29, cancel "is".

Signed and Sealed this

Twenty-second Day of February, 2000

Attest:

Q. TODD DICKINSON

Attesting Officer

Commissioner of Patents and Trademarks